United States Patent
Mallonee

[11] Patent Number: 5,124,200
[45] Date of Patent: Jun. 23, 1992

[54] FRAY RESISTANT AND ABSORBENT LIQUID TRANSFER WICK

[75] Inventor: Jerry M. Mallonee, Hickory, N.C.

[73] Assignee: Petco, Newton, N.C.

[21] Appl. No.: 581,517

[22] Filed: Sep. 12, 1990

[51] Int. Cl.$^5$ .................. D04H 1/04; D02G 3/00; D06P 7/00; D04C 1/00

[52] U.S. Cl. ................... 428/296; 428/131; 428/137; 428/377; 428/373; 428/325; 87/1; 87/6

[58] Field of Search ............ 428/377, 296, 373, 131, 428/137; 431/325; 87/1, 6, 9, 23

[56] References Cited

U.S. PATENT DOCUMENTS

| | | | |
|---|---|---|---|
| 652,548 | 6/1900 | Neustaedter | 431/325 |
| 1,974,037 | 10/1934 | Atkins | 431/325 |
| 2,197,866 | 7/1938 | Kahn | 431/325 |
| 2,313,058 | 3/1943 | Francis, Jr. | 57/235 |
| 2,829,511 | 4/1958 | Oesterle et al. | 431/325 |
| 3,462,235 | 9/1969 | Summers | 431/325 |
| 4,100,319 | 7/1978 | Schwartz | 428/296 X |
| 4,197,156 | 4/1980 | Nakajima et al. | 428/296 X |
| 4,211,819 | 7/1980 | Kunimune et al. | 428/296 X |
| 4,275,117 | 6/1981 | Crandall | 57/234 |
| 4,299,884 | 11/1981 | Payen | 57/234 |
| 4,378,725 | 4/1983 | Hospers et al. | 57/234 |
| 4,547,426 | 10/1985 | Montle | 428/377 |
| 4,921,756 | 5/1990 | Tolbert et al. | 428/377 X |

OTHER PUBLICATIONS

Petco, Inc. Brochure, Newton, N.C.

*Primary Examiner*—George F. Lesmes
*Assistant Examiner*—Terrel Morris
*Attorney, Agent, or Firm*—Bell, Seltzer, Park & Gibson

[57] ABSTRACT

An article adapted to be used as a liquid transfer wick and method for making same. The core is comprised of a heat fusible, nonwoven textile sheet material that is chemically inert to many solvents and oils. A binder is applied to the core in an open mesh braid to maintain the core in a predetermined compact condition. The outer portions of the core are heat fused to the binder forming a unitary fray resistant structure by the application of a flow of heated air which melts outer portions of the core exposed within the binder. The flow of heated air may be increased to create cavities in the outer portions of the core, thereby forming a wick that is absorbent along the outer longitudinal surface, as well as at the wick ends.

5 Claims, 2 Drawing Sheets

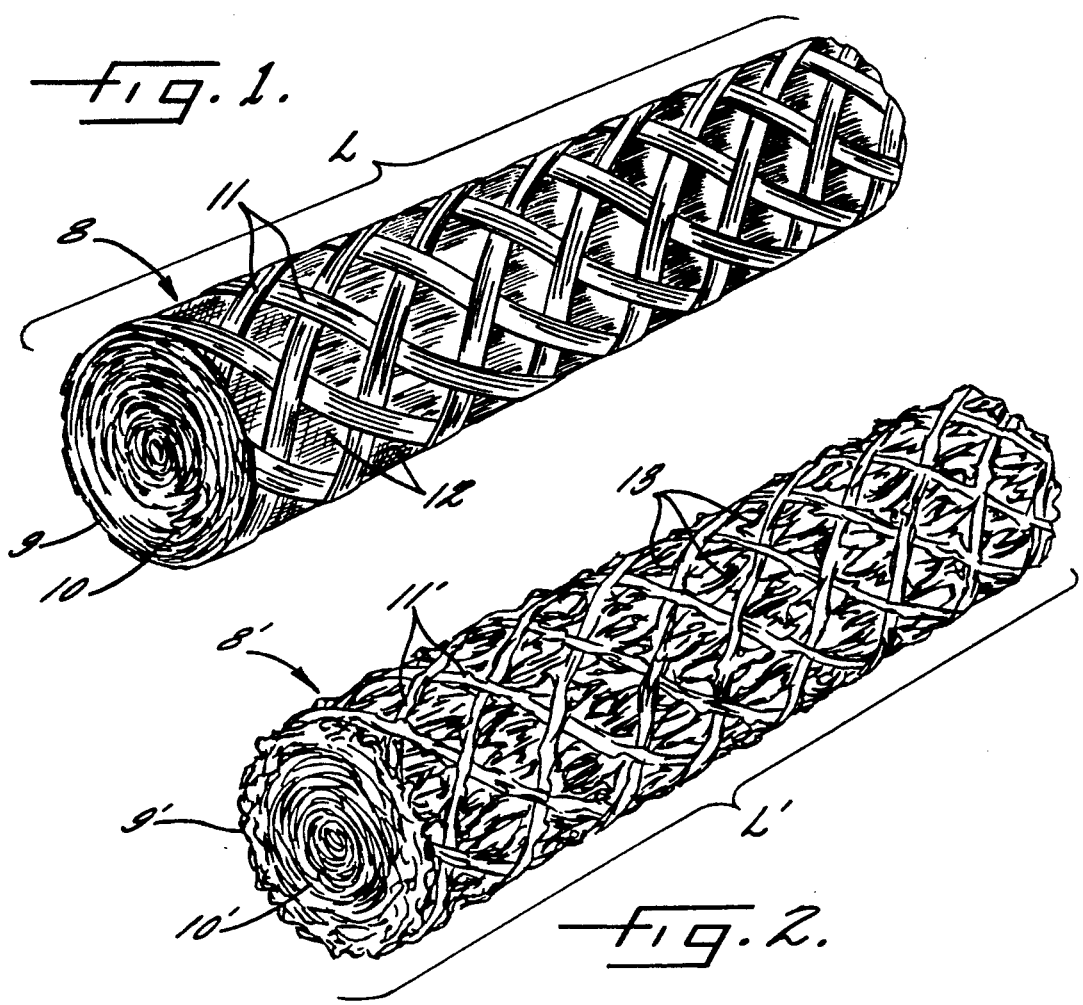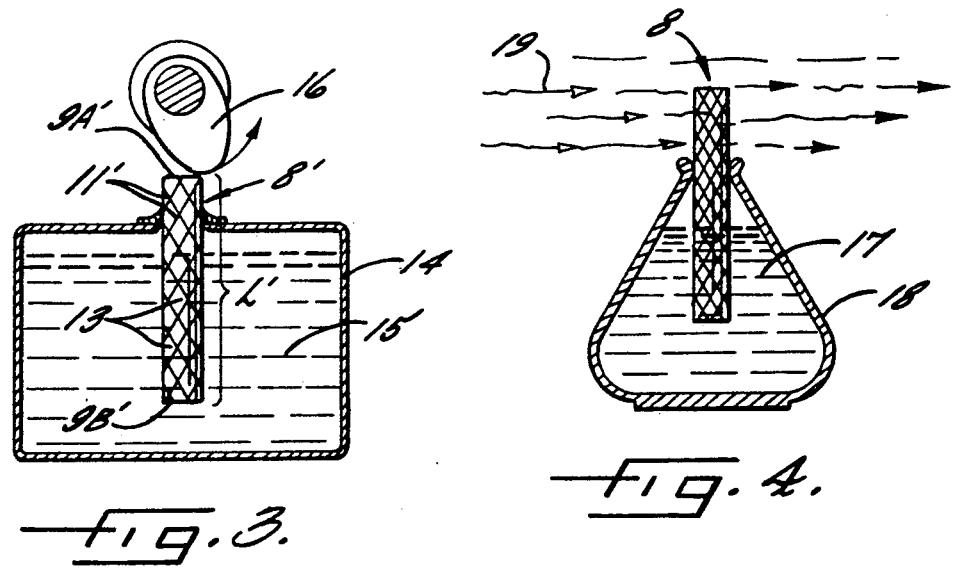

FRAY RESISTANT AND ABSORBENT LIQUID TRANSFER WICK

FIELD OF THE INVENTION

This invention relates to an article adapted to be used as a liquid transfer or scent dispersal wick and more particularly, to an article having a unitary fray resistant structure with an absorbent outer surface.

BACKGROUND OF THE INVENTION

Cylindrically-shaped articles of absorbent material may be adapted to be used as wicks in a wide variety of applications. For example, wicks may be used for liquid transfer and storage applications including ink and lubrication delivery systems, air freshening and perfume delivery, and gas and liquid filtering applications.

A wick conveys a liquid by capillary action, that is, by the force that results from greater adhesion of a liquid to a solid surface than the internal cohesion of the liquid itself. Thus, capillary action can cause a liquid to rise a vertical distance against the pull of gravity. For example, a computer printer may require that lubricating oil be distributed from a reservoir to its moving parts or that ink be distributed from a reservoir to print elements.

For lubrication, an absorbing wick may be placed in a reservoir of the lubricating oil to be transferred. A rotating cam may periodically contact the upper end of the wick to pick up a trace of the oil while the lower end remains in the reservoir. The upper end of the wick is kept saturated with oil by the capillary action of the wick drawing oil from the reservoir. The service life of the moving machinery may be greatly enhanced by this simple yet inexpensive lubrication system.

Prior art wicks designed for lubrication have been made which consist of an absorbent fibrous inner core surrounded by a non-porous plastic outer wrap. Since the core is formed of individual fibers approximately one to two inches in length, the fibers have a tendency to be displaced by the contact with the rotating cam. This initially causes mushrooming of the wick, the result being reduced effectiveness of the liquid transfer process. These fibers may also be picked up by the rotating cam and propagated throughout the machinery, thereby impeding performance or causing internal damage to the machine. Instead of trouble-free equipment operation, frequent service calls to repair and clean the machine are necessary.

A further disadvantage of prior art wicks for lubrication is that the non-porous plastic outer wrap prohibits any absorption of lubricating oil along the submerged length of the wick. For greater liquid volume transfer requirements, the absorption of the prior art wick is limited by the absorption through the surface area exposed only at the end of the wick. Also, if the submerged end of the wick becomes contaminated, the lubricating oil transfer process ceases despite oil remaining in the reservoir.

Porosity of the longitudinal exterior surface of a wick may also be highly desirable in scent dispersing applications, such as for air fresheners. The length of wick exposed to the air may be controlled to regulate the rate of scent release. Porosity of the outer surface may also be critical in the design of filters for gases or liquids.

Candle wicks which operate on the principle of capillary action of melted paraffin are well known in the art. For example, U.S. Pat. No. 2,829,511 to Oesterle et al. discloses a core of extruded cellulose acetate and strands of cotton fibers wound around the core. To help maintain the textile fibers tight around the core, ceresine or other wax-like substance may be applied to the fibers. While a candle wick may be absorbent along its length, it will not be resistant to mushrooming or fraying at an end that is subject to a periodic mechanical contact, such as the contact of a rotating cam in a lubrication application. Therefore, a candle wick is unsuitable for a liquid transfer application where a fray resistant structure is required.

Cylindrically-shaped structures that may be adapted to be used as a wick are known in other fields as well. For example, in the furniture industry, welt cords are often formed by a braided covering surrounding a core material to retain the core material in a consistent cylindrical shape. (A welt cord is a small cord covered with cloth or other textile material, sewed on a seam or border to strengthen it). The welt cord should maintain good flexibility; however, fraying of the cord ends during handling may frequently be controlled to the required degree by the braiding itself or by the addition of a single glue line applied along the length of the cord. When adapted to be used as a wick, the result of the non-unitary structure of the welt cord is fraying and mushrooming of the ends and a reduced liquid transfer efficiency. The single glue line of a braided welt cord may be attacked and dissolved by a variety of oils and solvents. The glue may also contaminate any transported liquid. Accordingly, the structure of the welt cord is unsuitable for use as a liquid transfer wick where fray resistance and chemical inertness are desired.

SUMMARY OF THE INVENTION

It is therefore an object of the present invention to provide a wick with a core maintained in a cylindrical shape and having improved fray resistance at a cut end.

It is a further object of the invention to provide a wick with improved fray resistance along its outer longitudinal surface while being absorbent along the outer surface.

It is still a further object of the invention to provide a wick which is chemically inert to a wide range of liquids, especially those liquids containing oils and solvents.

These and other objects are provided according to the present invention by an article adapted to be used as a wick and made of a heat fusible material that is formed into a cylindrically-shaped core having a predetermined compactness. The core is preferably a wadded sheet of nonwoven textile material made from thermoplastic fibers, such as polypropylene fibers. The degree of compactness of the core may be varied depending on the rate of absorption desired and the quantity of liquid to be transferred. The core thus formed absorbs liquids and is porous to gasses. The core overcomes the limitation of the prior art wicks that contained a fibrous core. Since the nonwoven material is a continuous longitudinally extending sheet, there are no individual fibers that may be extracted by periodic mechanical contact and further propagated throughout a piece of machinery.

In a preferred embodiment according to the invention, the compacted core is surrounded by a binder preferably formed by braiding a textile strand around the core. The open mesh braid has spaces therein which expose portions of the outer surface of the core. The binder is preferably a textile strand which exhibits a higher melting temperature than the thermoplastic material of the core. The amount of open spaces between the binder strands is a factor in controlling the absorbency of the article along its longitudinal surface.

In a preferred embodiment, the core and the binder are first heated, preferably with an infrared heater, to bring the core and binder near the melting temperature of the thermoplastic core. Heated air is then applied to the core and binder to first melt the outer portions of the core, and then force the melted material of the core to flow around the binder, thereby forming a fused unitary fray resistant structure. Since the outer portions of the core are brought to the melting temperature and allowed to flow and cool, the outer longitudinal surface of the article may be made with reduced absorbency depending on the desired application. The article, when used as a wick, is fray resistant at a cut end because the binder strand is heat fused to the outer portions of the core.

In an alternative embodiment, the flow of heated air is increased, thereby causing material from the outer portions of the core to be displaced outwardly and onto the binder. Accordingly, cavities are formed in the outer portions of the core. Since melted material is forced out of the cavities as the stream of air is applied, the surface of the cavities remains absorbent. The amount of air flow may be controlled to vary the depth of the cavities, thereby being an additional factor in controlling the absorbency of the longitudinal surface of the article. The wick is also resistant to fraying at any cut end.

No glues, which are subject to failure in the presence of many solvents, are needed to prevent a cut end of the article from fraying. In addition, since only a small amount of binder, or braiding, material is required compared to the quantity of core material, the article substantially retains the inherent chemical properties of the core material. In a preferred embodiment, the core material may be formed of polypropylene which remains chemically inert when exposed to a wide range of substances including organic solvents, acids and alkalis. Accordingly, the article will not contaminate a wide range of substances it is used in combination with, nor will the article be damaged by a wide range of substances.

BRIEF DESCRIPTION OF THE DRAWINGS

FIG. 1 is a cross-sectional perspective view of an article according to the present invention adapted to be used as a wick.

FIG. 2 is a cross-sectional perspective view of an alternative embodiment of an article according to the present invention adapted to be used as a wick.

FIG. 3 is a diagrammatic view of the article illustrated in FIG. 2, adapted for use as an oil wick used to transfer oil to a rotating cam.

FIG. 4 is a diagrammatic view of the article illustrated in FIG. 1, adapted for use as a scent dispersing wick.

DESCRIPTION OF THE PREFERRED EMBODIMENT

Figure 5:
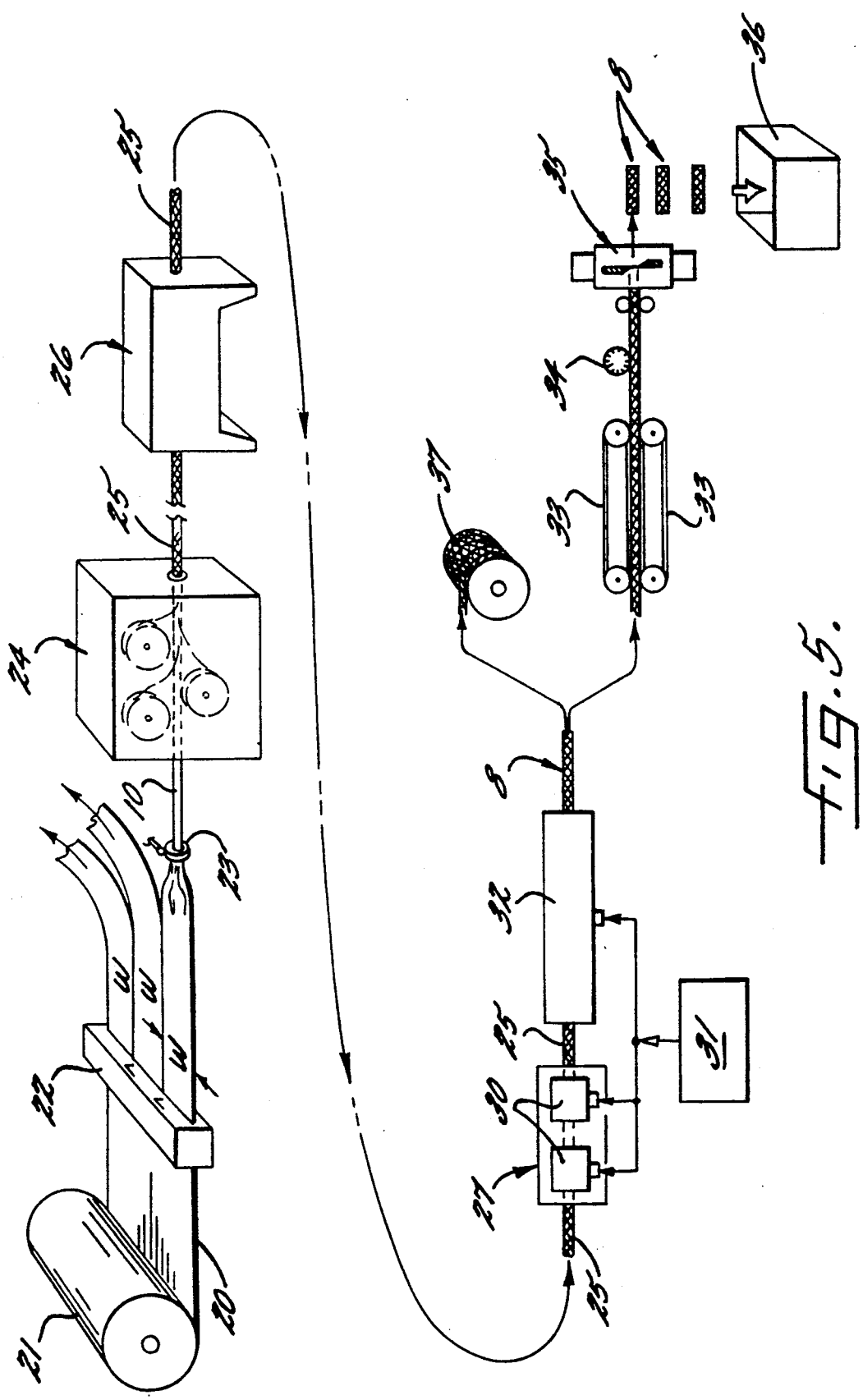
FIG. 5 is a schematic diagram of the method of making an article adapted to be used as a wick according to the present invention.

The present invention will now be described more fully hereinafter with reference to the accompanying drawings, in which a preferred embodiment of the invention is shown. This invention may, however, be embodied in many different forms and should not be construed as limited to the embodiment set forth herein, rather, applicant provides this embodiment so that this disclosure will be thorough and complete, and will fully convey the scope of the invention to those skilled in the art. Like numbers refer to like elements throughout.

FIG. 1 shows a perspective view of a cross-section of an article adapted to be used as a wick 8 according to the present invention. Because of the unique construction of the wick, the wick may be cut at any position along its length L to reveal the cross-section shown at the cut end 9. In the embodiment shown, the core 10 is formed of a single sheet of nonwoven textile material wadded into a compact cylindrical shape. This nonwoven textile material of the core 10 is formed of a heat fusible material. Preferably, the nonwoven textile material comprises a thermoplastic polymer, such as polypropylene, which is relatively inexpensive and which is also chemically inert to many oils and solvents that may be transported by the wick. As would be understood by those having skill in the art, other types of nonwoven materials may be used including, for example, polyester, polyethylene, nylons, and blended cellulosic fibers. The core material may be chosen to have certain properties depending on the liquid to be transferred. For example, polypropylene may be used to transfer lubricating oils because it is oleophilic.

The nonwoven sheet material of the core 10 may be formed from a number of processing applications well known in the art including carded, melt blown, spun bond, needled, and wet laid processes. Additionally, since the core 10 is in the form of a sheet material rather than individual fibers, the core material cannot be extracted from the core to contaminate machinery, as the individual fibers of the prior art wicks. As would be understood by one skilled in the art, the composition and amount of nonwoven material, and the degree of core compaction may be varied in order to achieve the desired absorbency, dimensions and flexibility of the finished wick.

The core 10 is held together in a compacted condition by the application Of a binder 11 strand yarn. This binder 11 may preferably be a textile strand or yarn material such as texturized polyester. For most applications, it is desirable that the binder strand yarn exhibit a higher melting temperature than the inner core 10. A co-extruded nylon/polypropylene yarn material may also be used as the binder in an alternative embodiment. The co-extruded yarn has an inner core of nylon which has higher relative melting temperature than the surrounding layer of polypropylene. As would also be known to one skilled in the art, polypropylene, nylons, rayon, cotton, and virtually any natural or thermoplastic yarn or blend may be used as the binder strand. Preferably, the binder 11 is applied around the core in an open mesh braid. However, binder arrangements other than the open mesh braid as illustrated may also be used. For example, a continuous helical wrapping may also be used.

In a preferred embodiment, heat is applied to the core 10 and binder 11 to heat the outer portions of the core to just below the core melting temperature. A flow of heated air is then applied to the outer portions of the core 10 causing the melted material to flow around the binder 11. The wick 8 is then cooled and the binder is thereby secured to the core as the thermoplastic material of the core cools and hardens. The open spaces 12 between the binder strands have a reduced absorbency from the basic core 10 material because the heated air fuses the material of the outer surface of the core. The wick 8 exhibits limited absorbency along its longitudinal surface, but is fray resistant at any cut end 9 and impervious to many oils and solvents that may be used in the liquid transfer process. Limited absorbency may be desired when evaporation from an exposed length of the wick 8 needs to be minimized.

FIG. 2 is a cross-sectional perspective view of an alternative embodiment of the present invention. To avoid repetition, elements in this embodiment which correspond to elements in the previous embodiment of FIG. 1 will be identified by corresponding reference numbers, with prime notation (') added. The wick 8' is formed from a core 10' of wadded nonwoven textile material held in a compacted condition by the application of a binder 11'.

In this embodiment according to the invention, the flow rate of heated air is increased over that used to form the wick shown in FIG. 1. Accordingly, cavities 13 are formed in the outer portions of the core 10', defined by the open spaces between the binder 11', as material from the core is melted and forced outward and around the binder. The material displaced from the cavities 13 may thereby be heat fused to the binder 11' securing the binder along the entire length L' of the wick 8'.

The wick 8' thus formed is a single unitary structure with excellent fray resistance at any cross-sectional cut 9'. In addition, the wick retains absorbency through its longitudinal outer surface because the cavities 13 expose absorbent portions of the core material. The overall liquid transfer rate of the wick from a reservoir, not shown, may be made considerably greater than prior art wicks which provided a non-porous plastic wrap along the entire core length which restricted liquid absorption to only a wick end.

Referring to FIGS. 1 and 2, because the binder 11, 11' represents a small portion of the overall composition of the wick 8, 8' by weight, the wick may be considered as chemically composed substantially entirely of core material such as polypropylene. Since heat is used to melt the thermoplastic material which fuses the binder 11, 11' to the core, no glue is required. Glue is subject to breakdown by many solvents and also may contaminate any liquid transported by the wick. The wick 8, 8' formed according to the present invention overcomes the limitations of prior art concerning chemical purity and breakdown in the presence of many oils and solvents.

FIG. 3 illustrates the wick 8' according to the present invention, as shown in FIG. 2, used in a machinery lubricating application, such as computer printer lubrication. The wick is disposed in a reservoir 14 containing lubricating oil 15. The oil is drawn, by capillary action, to the upper cut end 9A' of the wick 8' where a rotating cam 16 makes periodic contact with the cut end. This periodic contact is designed to transfer a quantity of oil 15 onto the cam 16 to be further transferred to the other mechanical parts, not shown, such as gears and bearings.

Since the wick 8' is composed of a continuous wadded sheet material, rather than individual fibers as in the prior art, no fibers may be drawn out of the wick by the rotating cam 16 to contaminate the machine. There are also no fibers to be drawn out of the lower cut end 9B' to contaminate the reservoir 14. Mushrooming of the wick at the cut end 9A' is similarly avoided by the fray resistant structure of the wick. The result is consistency of the liquid transfer process without machine or reservoir contamination.

The quantity of oil 15 delivered to the upper end 9A' of the wick is not restricted by the absorption that takes place at the limited surface area of the lower end 9B'. Instead, oil 15 may be absorbed by the cavities 13 exposed to oil along the length L' of the wick submerged in the reservoir 14. Accordingly, a greater oil transfer rate may be achieved by the wick according to the present invention.

FIG. 4 illustrates the wick 8 according to the present invention, as shown in FIG. 1, used for aromatic scent dispersal, such as for an air freshener. The wick is submersed in the liquid scent 17 contained in the sealed reservoir 18. The liquid scent 17 is drawn up the wick by capillary action. The length of the saturated wick s exposed to the ambient air 19 disperses the scent into the ambient air by evaporation. The intensity of the scent released into a room may be controlled by varying the exposed length of the wick by any suitable height adjusting mechanism, not shown. The 2ick 8 and reservoir 18 may be contained in a protective housing, not shown, which permits ambient air 19 to circulate around the length of exposed wick.

FIG. 5 illustrates the method of making the article according to the present invention. A stock sheet of nonwoven textile material 20 is fed from its storage roll 21 through a cutter 22 which slits the sheet material 20 into desired widths W. The material 20 may then be stored on separate storage rolls, not shown, for later processing or may be continuously fed through a forming eye 23 which wads the sheet material 20 in a random manner into a compacted cylindrical shape. As will be readily understood by one skilled in the art, the width W of the nonwoven material 20 and the degree of compaction caused by passing the material through the forming eye 23 influence the final absorbency, flexibility and overall diameter of the finished wick and may be controlled according to these characteristics desired in the finished wick.

The compacted sheet material 20, which forms the core, is directed from the forming eye 23 to a braiding machine where a binder 11 (FIG. 1) is applied around the core in the form of an open mesh braid. Suitable braiding machines are well known in the art or may be adapted from shoestring braiding machines by those skilled in the art. The binder holds the nonwoven material 20 in a compacted condition.

The braided core 25 may be placed onto storage reels, not shown, for subsequent fusing operations or may be continuously fed into a preheater stage 26, such as an infrared radiation oven, which raises the temperature of the outer portions of the core. The preheater 26 may cause the braided core 25 to reach a temperature of 700° to 900° Fahrenheit. However, as would be readily understood by one skilled in the art, the speed of the braided core passing through the preheater may be varied to cause the temperature of the braided core to be raised to a much lower value than the full temperature range of the preheater.

In a preferred embodiment, the preheater 26 raises the temperature of the outer portions of the braided core 25 to a point just below the melting point of the nonwoven sheet material 20. For example, the melting temperature for a nonwoven sheet material of polypropylene is 335° Fahrenheit.

The preheated braided core 25 is then passed through an air flow heater 27 which directs a stream of heated air onto the surface of the braided core 25. The air flow heater 27 may be comprised of one or more air heat guns 30 which may be connected to a suitable compressed air source 31. The air heat guns 30 may provide air at a temperature of from 800° to 1,000° Fahrenheit at a flow rate of up to 22 cubic feet per minute. The heated flow of air melts the outer portions of the core 10 (FIG. 1) exposed within the binder and forces melted material of the core outward onto the binder, thereby fusing the core and the binder into a single unitary structure.

The heated air flow rate from the heater 27 determines the absorbency of the longitudinal surface of the finished wick 8. If a relatively non-absorbent surface is desired, the air flow rate may be reduced to leave a greater percentage of fused core material in the open space 12 (FIG. 1). If greater absorbency is desired, the air flow rate may be increased to force melted material outward onto the binder, thereby forming absorbent cavities 13 (FIG. 2). The depth of any cavities maybe controlled by the air flow rate of the heater 27.

In a preferred embodiment of the invention, the binder 11 (FIG. 1) may be formed of texturized polyester yarn which has a melting point of 507° Fahrenheit. Accordingly, the air temperature and flow rate may be controlled to cause selective heating of outer portions of the core material without melting the binder. In an alternative embodiment of the invention, the binder may be formed of a co-extruded nylon/polypropylene yarn. When the co-extruded yarn is heated to the melting point of polypropylene, the polypropylene core material and the polypropylene in the yarn fuse together to form a single unitary structure. As will be readily understood by one skilled in the art, the speed of passage of the braided core 25 through the heater 27 is also a factor, along with the air temperature and air flow rate, in effecting the fusing of the inner core to the binder.

The braided core 25 may then be passed through a cooling chamber 32 which provides a stream of ambient air from a compressed air source 31 onto the braided core to cool the material for subsequent handling. The article formed by the above steps may be cut and packaged into desired lengths by processing machinery well known in the art. For example, the continuous length of the article may be drawn between two opposing moving belts 33, fed past an automatic length counter 34, and cut to desired lengths by a razor cutter 35. The cut lengths may then be packed and stored in an appropriate container 36. Alternatively, the continuous length may be stored on a take-up reel 37 for later processing.

From the foregoing method steps, it is seen that the overall structure of the article resists fraying at any cross-sectional cut 9 (FIG. 1). The degree of absorbency of the outer longitudinal surface of the article may be controlled. Since the core 10 is a nonwoven sheet material, it will not mushroom or blossom as a result of physical contact at a cut end. The article formed with a core of a nonwoven material such as polypropylene will also be inert to many organic solvents, strong acids, and alkali liquids.

A cylindrically-shaped article formed of nonwoven absorbent textile core according to the present invention may be used for many other applications, such as, liquid transfer and storage including ink delivery systems, and gas and liquid filtering applications. Other possible uses will readily suggest themselves to one skilled in the art.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

What is claimed is:

1. An article adapted to be used as a wick and comprising a cylindrically shaped core formed of a heat fusible non-woven textile sheet material of synthetic textile fibers wadded into said cylindrical shape, an open mesh braid formed of textile strand material surrounding said core and serving for maintaining said core in said cylindrical shape, said synthetic textile fibers forming said non-woven textile sheet material having a lower melting temperature than the textile strands of said open mesh braid, and said textile fibers forming outer portions of said non-woven textile sheet material being fusibly bonded to said strand material of said open mesh braid to form an integral structure therewith.

2. The article of claim 1 wherein said nonwoven textile material comprises polypropylene fibers.

3. The article of claim 1 wherein said textile strand material comprises a texturized polyester yarn.

4. The article of claim 1 wherein said textile strand material comprises a yarn formed of co-extruded nylon/polypropylene filaments.

5. The article of claim 1 wherein said core comprises fused crater-like cavities formed in said outer portions thereof, said core material from said cavities being displaced and heat fused to said open mesh braid.

* * * * *

UNITED STATES PATENT AND TRADEMARK OFFICE
CERTIFICATE OF CORRECTION

PATENT NO. : 5,124,200
DATED : June 23, 1992
INVENTOR(S) : Jerry M. Mallonee

It is certified that error appears in the above-indentified patent and that said Letters Patent is hereby corrected as shown below:

Column 4, line 43, delete "of" and substitute therefor --of--.
Column 6, line 18, delete "wick s" and substitute therefor --of--.

Column 6, line 23, delete "2ick" and substitute therefor --wick--.

Signed and Sealed this

Twenty-fourth Day of August, 1993

Attest:

BRUCE LEHMAN

Attesting Officer        Commissioner of Patents and Trademarks